's. Patent

[19] United States Patent
Ernst

[11] Patent Number: 4,922,489
[45] Date of Patent: May 1, 1990

[54] CIRCUIT CONFIGURATION FOR ROUTINE TESTING OF THE CLOCK SUPPLY OF A LARGE NUMBER OF UNITS OPERATED WITH THE SAME CLOCK

[75] Inventor: Wolfram Ernst, Munich, Fed. Rep. of Germany

[73] Assignee: Siemens Aktiengesellschaft, Berlin and Munich, Fed. Rep. of Germany

[21] Appl. No.: 244,219

[22] Filed: Sep. 14, 1988

[30] Foreign Application Priority Data

Oct. 23, 1987 [DE] Fed. Rep. of Germany ....... 3736000

[51] Int. Cl.$^5$ ............................................... H04J 3/06
[52] U.S. Cl. ..................................... 370/100.1; 370/13
[58] Field of Search ...................... 370/13, 16, 17, 100, 370/100.1; 375/108; 331/46, 49

[56] References Cited

U.S. PATENT DOCUMENTS 3,803,568  4/1974  Higashide ........................... 375/108
4,254,492  3/1981  McDermott, III ................... 331/49
4,480,198  10/1984  Gass ................................... 375/108
4,574,377  3/1986  Miyazaki et al. .................. 375/108
4,635,249  1/1987  Bortolini et al. .................... 375/108

Primary Examiner—Douglas W. Olms
Assistant Examiner—Wellington Chin
Attorney, Agent, or Firm—Jeffrey P. Morris

[57] ABSTRACT

A circuit configuration for the routine testing of the clock supply of a large number of digital TDM telecommunication units operated with the same clock, wherein a clock supply with stand-by generator through a corresponding arrangement of several monitor circuits and arrangements of on/alter switches, the operatability of the monitor circuits themselves can be tested so that on routine testing independent of the switching position of a change-over switching device effective upon switching a generator from stand-by operation to active operation respectively the same generator always acts upon the partial distribution system.

1 Claim, 6 Drawing Sheets

CIRCUIT CONFIGURATION FOR ROUTINE TESTING OF THE CLOCK SUPPLY OF A LARGE NUMBER OF UNITS OPERATED WITH THE SAME CLOCK

BACKGROUND OF THE INVENTION

1. Field of the Invention

The invention relates to a circuit configuration for routine testing of the clock supply of a large number of units operated with the same clock, preferably units of a digital time division multiplex telecommunication system, in which two clock generators are synchronized with respect to frequency but are not phase-locked, and depend on the switching position of a switching device supply as an active clock generator. A doubled distribution system, is provided having two parts to which the individual units are optionally connected and in which the common time for the units or stand-by as a locked clock generator to take over the clock supply in the event a spare line is switched in. Each of the units has a monitoring device which responds when their individual clock supply fails.

2. Description of the Prior Art

In redundant clock supply routine testing, it is of particular importance that ensurance is given that in the event of replacement switching the clock generator which functioned up to this point as a stand-by generator as well as the supply paths to the distribution systems function properly. Due to the importance which is placed on clock supply in a central device, for example, of a telecommunication system, it is also desirable to check the operatability of the monitoring circuits themselves.

If it is not possible to synchronize the two clock generators phase-locked, each time change-over switching from the active clock generator to the stand-by clock generator takes place, then data disturbances occur which in the event of a switch over due to malfunction can be accepted since due to finite error recognition, time clock interruption is unavoidable. Change-overs in the course of routine tests done with relatively great frequency must be avoided.

SUMMARY OF THE INVENTION

The object of the present invention is to provide an improved circuit configuration for testing a clock supply so that problems during change-over switching which must be done routinely are avoided and, beyond the testing of clock generators and the supply paths the monitor circuits used for the process can also be monitored.

Because of the use according to the invention of on-/alternative (alter) switches it is possible to switch a parallel path from one clock generator to the actual alter switching device functioning to switch over from one clock generator to the other so that even after a change of the switching position of the alter switching device the distribution systems are still supplied by the same clock generator, thus, a phase shift does not occur by such change-over. Due to the number of monitor devices, their connection, and the possibility of disconnecting them intentionally, it is possible to check the operatability of these monitor devices in separate testing steps.

The invention is explained in greater detail in conjunction with a preferred embodiment described with reference to the drawings.

DESCRIPTION OF THE PREFERRED EMBODIMENT

Figure 1:
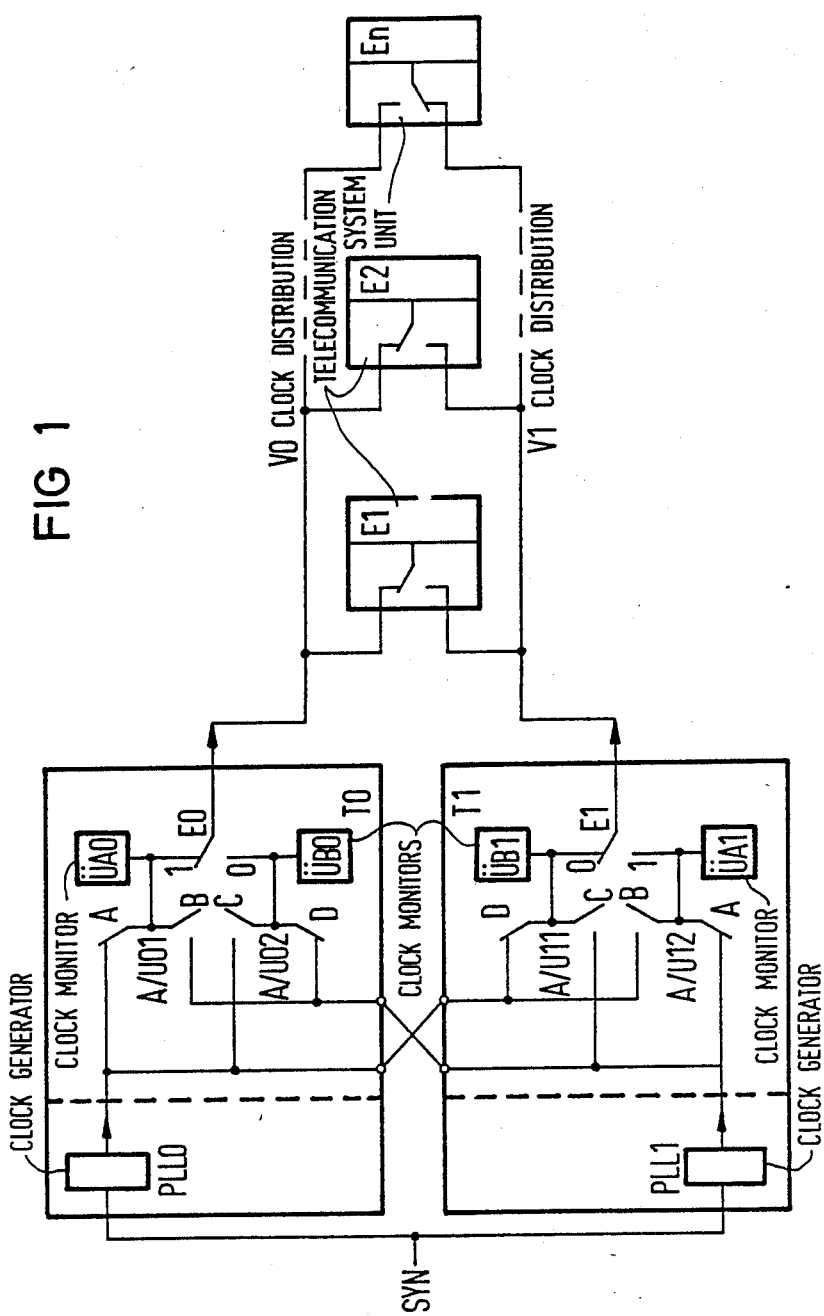
FIG. 1 is a circuit diagram of the circuit configuration according to the invention along with the clock generators to be monitored, the clock distribution system and the units supplied with the clock.

In FIG. 1 two clock generators are indicated by PLL0 and PLL1 which are synchronized with a master clock, however, the clock supplied by them not being phase-locked.

These clock generators supply two clock distribution systems V0 and V1 to which units E1 to En which need to be supplied are connected. As the drawing shows, the connection of these units to the clock systems varies depending on whether with some of these units due to a disturbance of the individual clock inputs change-over switching from one clock system to the other has taken place. The units E1 to En have individual monitor devices (not shown), which respond if the individual clock supply is disturbed which can have its causes in these units as well as may also be traced back to disturbances of the distribution systems or the clock supply through clock generators PLL0 and PLL1. Accordingly, the evaluation of the alarm signals supplied by these monitor devices can have different consequences. Specifically, it can lead to a change of the connection to another of the two distribution systems for some of the units, or it can bring about change-over switching of the clock supply from one of the clock generators PLL0 and PLL1 to the other.

Parts T0 and T1 of the circuit configuration according to the invention each have one pair of further monitor devices ÜA0, ÜB0, and ÜB1, ÜA1. Further, two pairs of on/alter switches are provided A/U01; A/U02 as well as A/U11; A/U12. In their change-over position these on/alter switches depending on the switching position establish a connection between the output of the one or the other clock generator PLL0 and PLL1 and a contact 0,1 of one of the alter switches E of an alter switching device with the help of which either the one or the other clock generator is applied to the two distributor systems V0 and V1. Hence, for example through the on/alter switch A/U01 in the shown change-over position, the clock generator PLL0 is applied to the one contact 1 of alter switch E0 via which the connection of the distribution system V0 to this clock generator PLL0 takes place. In the other change-over position of the on/alter switch A/U01 (with the same switching position of alter switch E0) the clock generator PLL1 is connected to the distribution system V0.

The monitor circuits ÜA0, ÜB0, and ÜB1, ÜA1 are so arranged that with them, in so far as the on/alter switches assume one of their change-over switching positions, it can be determined whether the one or the other clock generator properly supplies a clock all the way to the alter switching devices with the alter switches E0 and E1. If the on/alter switches assume their switching off position, the particular monitor device is cut off from the clock generators.

Figure 2:
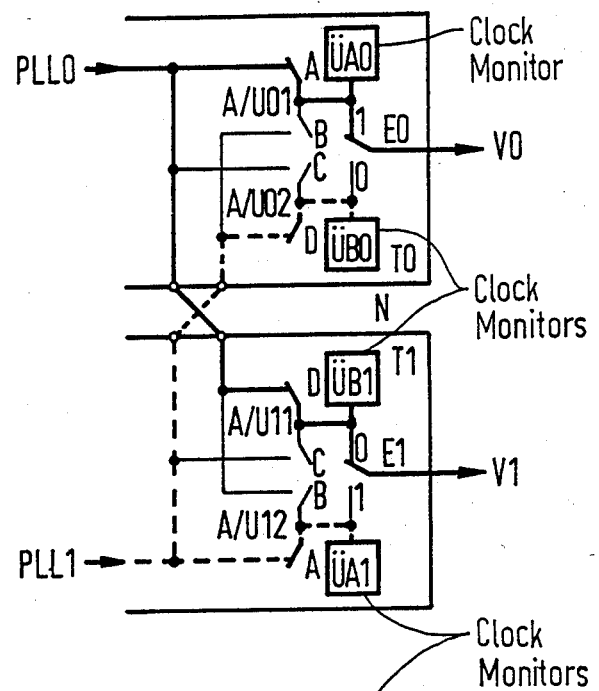
FIGS. 2 to 8 are circuits showing the actual test circuit in various different switch configurations relating to various testing states.

In the normal circuit configuration as it is shown in FIG. 1 and again separately in FIG. 2, the distribution systems V0 and V1 are supplied by clock generator PLL0, with the monitor device ÜA0 functioning to monitor whether or not the clock gets to alter switch E0 via which the distributor system V0 is reached and monitors the monitor device ÜB1 with respect to whether or not the clock gets to alter switch E1 of the alter switching device over which the distribution system V1 is reached.

Figure 10:
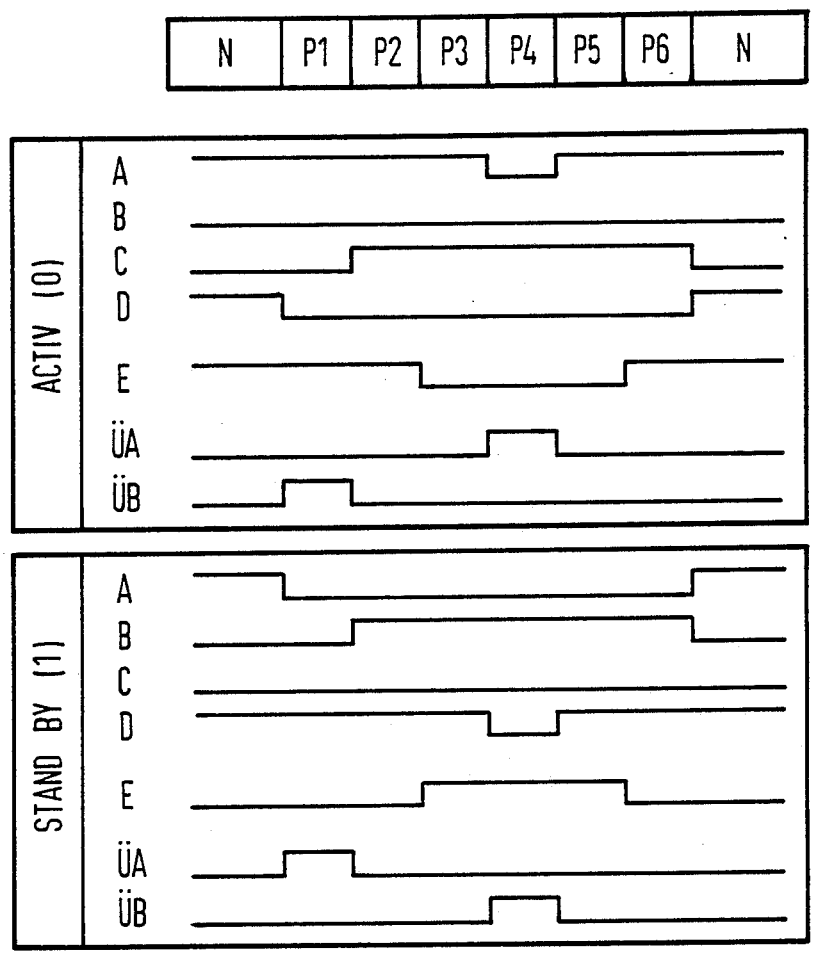
FIG. 10 is a pulse diagram of a testing process.

In this normal position the on/alter switches A/U02 and A/U12 assume such change-over position that the clock supplied by clock generator PLL1 which functions as the stand-by generator reaches contact 0 of change-over switch E0 respectively contact 1 of alter switch E1 of the alter switching device. The monitor device ÜB0 functions accordingly to check the proper state of readiness of the clock for the distribution system V0 through the clock generator PLL1, while the monitor device ÜB1 monitors such state of readiness regarding the distribution system V1. Similarly, the monitor device ÜB0 monitors the state of readiness of a clock for the distribution system V0 and the monitor device ÜA1 the readiness for the distribution system V1 in each instance through clock generator PLL1. In FIG. 10 timing diagrams are shown for the normal configuration and for the test configurations P1 to P6 corresponding to switch positions of the contacts A to D respectively 0 to 1 of the on/alter switches A/U01 to A/U12 respectively the change-over switching device E0/01 on the assumption that the clock generator PLL0 is the currently active clock generator and the clock generator PLL1 is the current stand-by generator.

Figure 3:
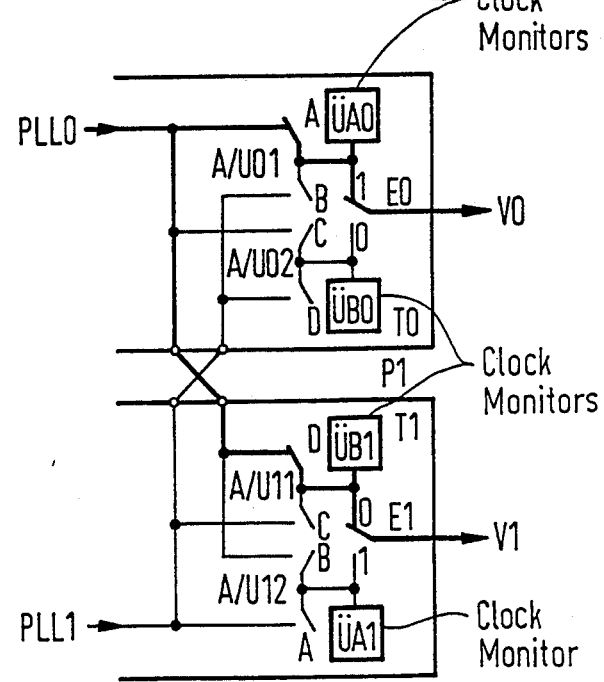

In the test configuration P1 according to FIG. 3, the on/alter switches A/U01 and A/U11 still have the switching position shown in FIG. 2, while on/alter switches A/U02 and A/U12, are in their switching off position, which cuts off the monitor devices ÜB0 and ÜA1 from the clock generators. The two monitor devices must respond to operate properly.

Figure 4:
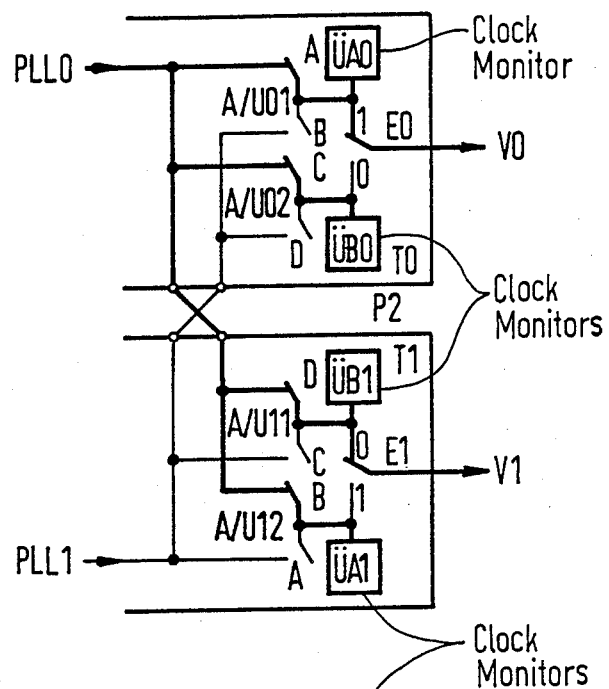

In test configuration P2 according to FIG. 4 through appropriate activation of contacts C and B of the on/alter switches A/U02 and A/U12 a parallel path is set for the supply of the clock through clock generator PLL0 to the alter switches E0 and E1 of the change-over switching device. This test configuration represents a preparatory step to the test configuration according to FIG. 5 which differs from that according to FIG. 4 in that now the alter switches E0 and E1 of the change-over switching device assume their other switching position. Because of the previously set parallel paths in this changed switching position also the distribution systems V0 and V1 are supplied by clock generator PLL0 so that a situation as previously described cannot occur in which, due to phase shifts data losses can occur. If the contacts of alter switches E0 and E1 do not close properly in the new switching position, the monitor device, at least if not all of units E1 are connected to one and the same distribution system, of one or several of these devices E1 to En will respond and in this way signal improper functioning of one of the alter switches E0 or E1.

Figure 5:
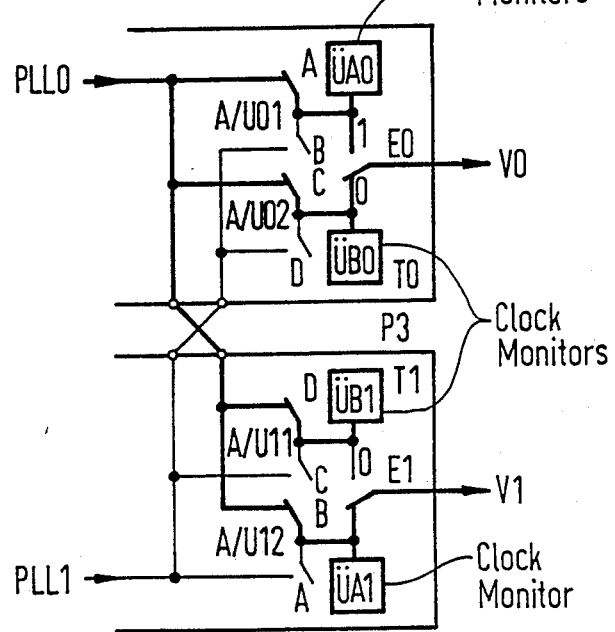
Figure 6:
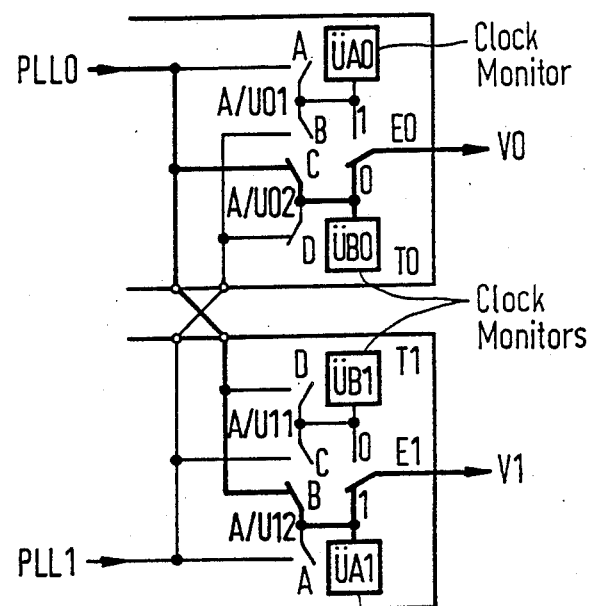

In the test configuration P4 according to FIG. 6 the on/alter switches A/U01 and A/U11 assume their switching off position, whereas the switching position of the two remaining on/alter switches relative to the configuration in FIG. 5 remain unchanged. Hence, the monitor devices ÜA0 and ÜB1 are cut off from clock generator PLL0 so that they must respond if they are functioning properly respectively in the event that they do not respond their malfunctioning is signalled.

Figure 7:
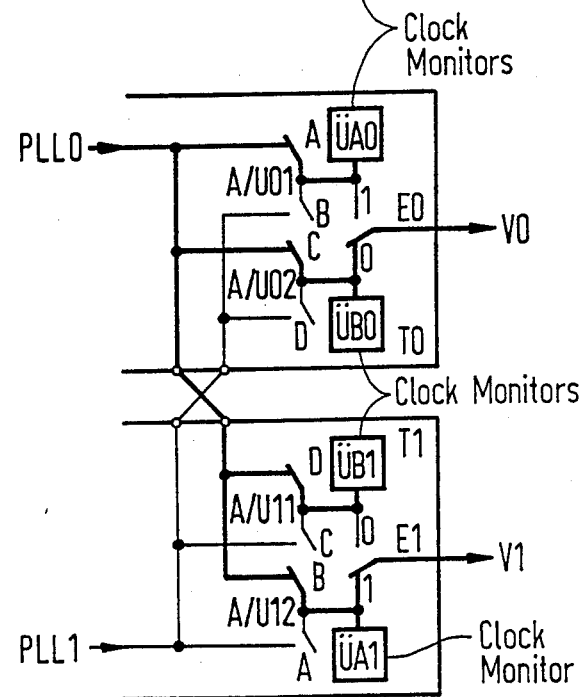
Figure 8:
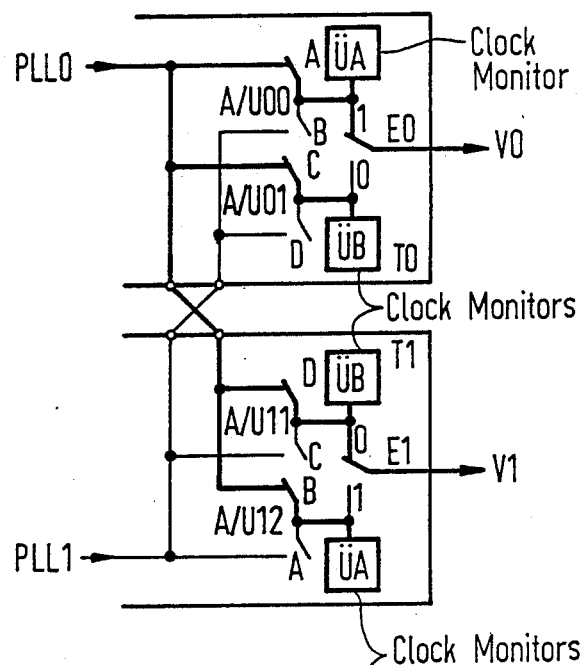

With the test configuration P5 according to FIG. 7 through activation of contacts A and D of the on/alter switches A/U01 and A/U11 again a parallel path for the supply of the clock to the alter switches E0 and E1 from the clock generator PLL0 is set with which a preparatory step for resetting these alter switches according to the switching configuration P6 in FIG. 8 has been taken.

If after such change-over switching contact 1 of the upper alter switch E0 respectively of contact 0 of the lower alter switch E1 does not close properly, again, with the above discussed restriction in the case of one of devices of E1 to En, the monitor device present there will respond and thereby signal the improper functioning of these alter switches.

Figure 9:
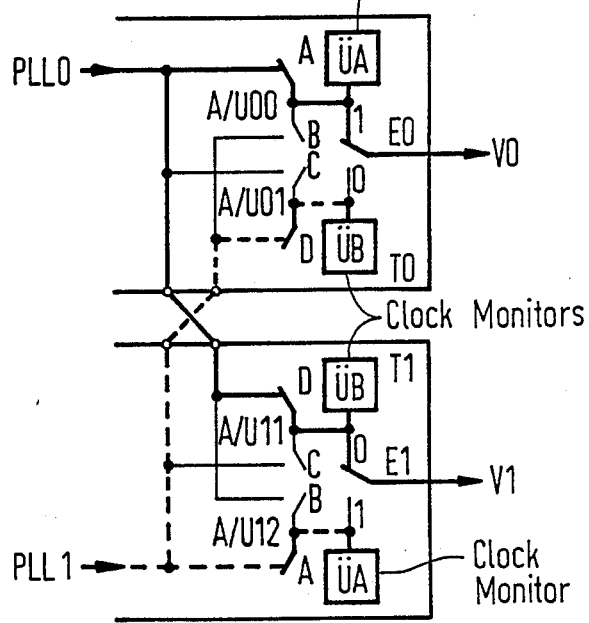

The test configuration shown in FIG. 9 corresponds to the standard configuration shown in FIG. 2.

Activation of the two alter switches E0 and E1 of the change-over switching device to produce the test configuration P3 respectively P6 must take place synchronously and during an interpulse period so that a distortion of the clock pulses is avoided.

If the test process begins in a state in which the clock generator PLL1 is the active and the clock generator PLL0 the stand-by generator, corresponding test configurations result.

I claim:

1. A circuit configuration for routine testing of the clock supply of a large number of digital time division multiplex telecommunication system units operated by the same clock, in which two clock generators are operated synchronously with respect to frequency, but not phase-locked with respect to each other, depending on the switching position of a change-over switching device, function alternatively as an active clock generator via a first and a second distribution system to which the individual telecommunications system units are connected, to supply a common clock for the units, or as a stand-by for taking over the clock supply in the event of replacement switching, and with each of said telecommunication system units having a monitor device responding in the event of failure of their individual clock supply as provided by a selected one of said clock generators, the improvement comprising:

pairs of additional monitor devices in which one of said additional monitor devices monitors one of said clock generators supplying said first distribution system and also monitors one of said clock generators supplying said second distribution system and including other monitor devices to monitor the other clock generator through two pairs of on/alter switches which are each respectively connected between one of the clock generators and a corresponding change-over switch of said switchover arrangement, with each of the on/alter switches of the pairs in the change-over switching position establishing a connection to the other clock generator and thereby, depending on the switching position of the particular alter switch of the change-over switching device, couple or decouple the clock as provided by said clock generators to said first or second distribution system and with each of the on/alter switches in its switching off position cutting off another of the monitor devices in pairs from one of the clock generators.

* * * * *